(12) United States Patent
Crum et al.

(10) Patent No.: US 8,206,543 B2
(45) Date of Patent: Jun. 26, 2012

(54) METHOD OF MANUFACTURING PATTERN COATED WEB CONFIGURATIONS FOR USE IN PRODUCING SHAPED PRIME LABELS

(75) Inventors: Jesse D. Crum, Fort Scott, KS (US); D. Mark Tucker, Fort Scott, KS (US)

(73) Assignee: Ward Kraft, Fort Scott, KS (US)

( * ) Notice: Subject to any disclaimer, the term of this patent is extended or adjusted under 35 U.S.C. 154(b) by 900 days.

(21) Appl. No.: 11/329,549

(22) Filed: Jan. 11, 2006

(65) Prior Publication Data
US 2006/0263562 A1 Nov. 23, 2006

Related U.S. Application Data

(63) Continuation-in-part of application No. 11/135,481, filed on May 23, 2005, now abandoned, and a continuation-in-part of application No. 11/135,179, filed on May 23, 2005, now abandoned, and a continuation-in-part of application No. 11/135,131, filed on May 23, 2005, now abandoned.

(51) Int. Cl.
B29C 65/52 (2006.01)
B32B 37/12 (2006.01)
B32B 38/10 (2006.01)
B32B 38/14 (2006.01)
B32B 37/20 (2006.01)
B32B 37/22 (2006.01)

(52) U.S. Cl. ........ 156/267; 156/250; 156/258; 156/277; 156/289

(58) Field of Classification Search .................. 156/250, 156/277, 289, 258, 257, 267
See application file for complete search history.

(56) References Cited

U.S. PATENT DOCUMENTS

| | | | | | |
|---|---|---|---|---|---|
| 2,095,776 | A | * | 10/1937 | Von Hofe | 427/207.1 |
| 2,304,787 | A | * | 12/1942 | Avery | 156/248 |
| 3,869,328 | A | * | 3/1975 | Instance | 156/285 |
| 4,664,416 | A | * | 5/1987 | Steidinger | 462/2 |
| 5,464,289 | A | * | 11/1995 | Beaudry | 400/62 |
| 5,516,393 | A | * | 5/1996 | Freedman | 156/229 |
| 5,577,170 | A | * | 11/1996 | Karow | 358/1.11 |
| 5,578,352 | A | * | 11/1996 | Smith | 428/40.1 |

(Continued)

FOREIGN PATENT DOCUMENTS

EP 0414362 A2 * 2/1991

(Continued)

OTHER PUBLICATIONS

Berman et al. "Labels". 1983, National Business Forms Association. pp. 14-15.*

(Continued)

*Primary Examiner* — Sonya Mazumdar
(74) *Attorney, Agent, or Firm* — Lathrop & Gage LLP

(57) ABSTRACT

The present invention is directed to a continuous process that may be utilized to create an intermediate web assembly that includes a plurality of individual prime label segments with each segment having printed portion that has an outline and a pattern coated adhesive disposed on a first web which has an outline such that when the printed portion is applied over the pattern of adhesive, the outlines of each are substantially in alignment with one another. The process is utilized to create intricately shaped prime label products.

8 Claims, 5 Drawing Sheets

U.S. PATENT DOCUMENTS

| | | | |
|---|---|---|---|
| 5,584,955 A * | 12/1996 | Instance | 156/267 |
| 5,587,214 A * | 12/1996 | Mitchell, Jr. | 428/40.1 |
| 6,531,024 B1 * | 3/2003 | Braun | 156/277 |
| 6,890,623 B2 * | 5/2005 | Onishi et al. | 428/195.1 |
| 6,982,114 B2 * | 1/2006 | Crum | 428/192 |
| 7,658,812 B2 * | 2/2010 | Crum | 156/248 |
| 2002/0084026 A1 * | 7/2002 | Matthews et al. | 156/267 |
| 2004/0216834 A1 * | 11/2004 | Ito et al. | 156/272.2 |
| 2005/0058811 A1 * | 3/2005 | Crum | 428/192 |
| 2007/0113966 A1 * | 5/2007 | Eckstein et al. | 156/267 |

FOREIGN PATENT DOCUMENTS

| | | | |
|---|---|---|---|
| GB | 2259888 A | * | 3/1993 |
| JP | 02118687 A | * | 5/1990 |

OTHER PUBLICATIONS

"Fugitive glue"—http://en.wikipedia.org/wiki/Fugitive_glue; Jan. 22, 2011.*

English translation of abstract of JP02118687A, Takenoshita et al. May 1990.*

* cited by examiner

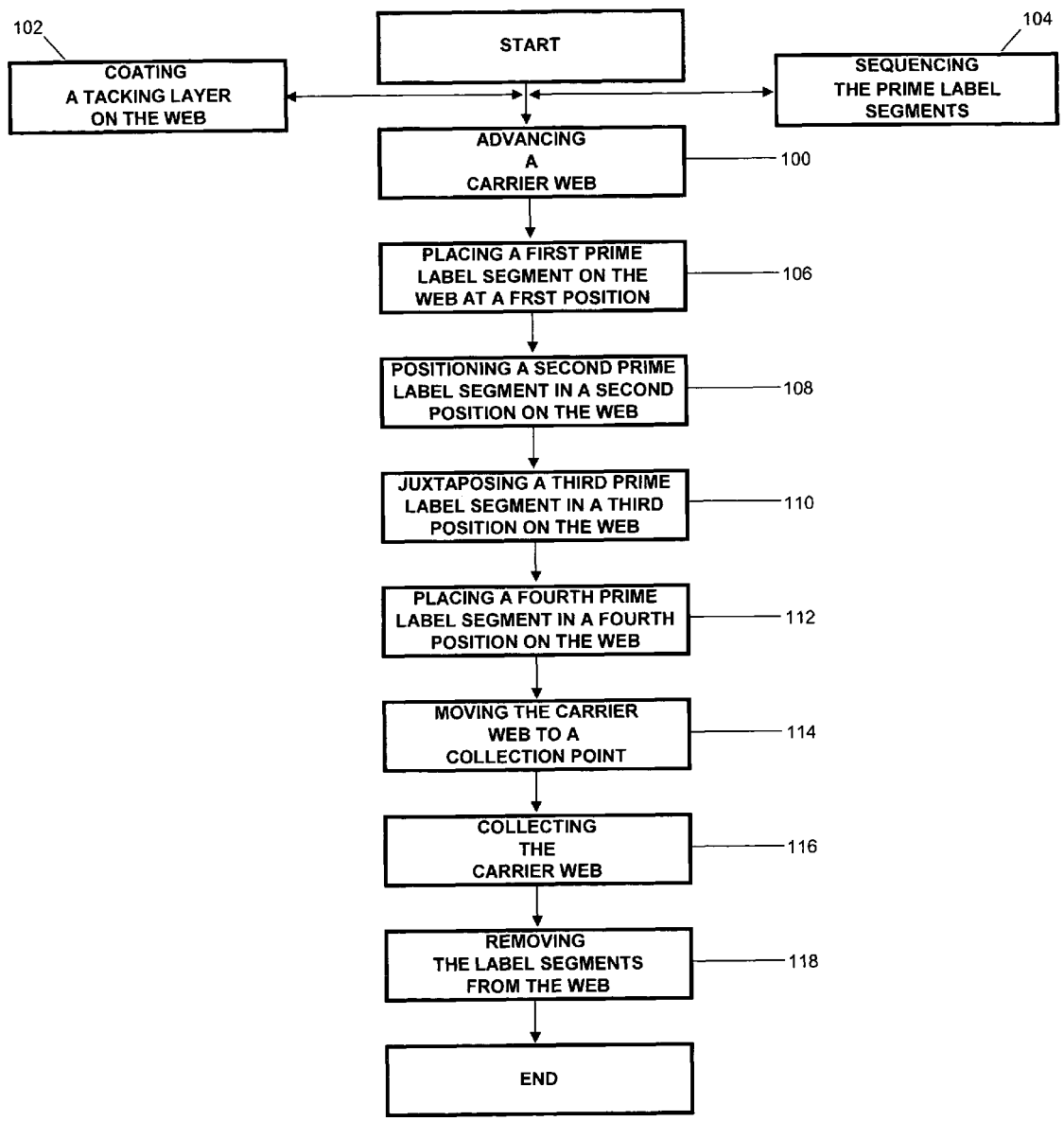

METHOD OF MANUFACTURING PATTERN COATED WEB CONFIGURATIONS FOR USE IN PRODUCING SHAPED PRIME LABELS

CROSS-REFERENCES TO RELATED APPLICATIONS

This application is a continuation-in-part of application Ser. No. 11/135,481 filed May 23, 2005 now abandoned, Ser. No. 11/135,179 filed May 23, 2005 now abandoned and Ser. No. 11/135,131 filed May 23, 2005 now abandoned the disclosures of each of which including that found in the claims is incorporated herein by reference.

FIELD OF THE INVENTION

The present invention is in the field of composite, intermediate manufacturing methods that are used in the preparation of articles, such as pressure sensitive laminates intended for use as a prime label. More particularly, such intermediate laminated assemblies may be used in the production of prime label products which may be provided to an end user with a pattern coated liner or carrier web assembly. The pattern coated adhesive web enables the production of highly intricately shaped prime label assemblies.

The present invention is used to produce business and marketing communications that are manufactured in a unique and continuous process. The instant specification may include providing a release coated carrier web with a shaped pattern coated adhesive, a shape generally other than geometric, e.g. square, rectangular, circular and triangular, and then applying a previously prepared, high quality, pre-printed portion or material over the top of the carrier web and pattern of adhesive such that the outline of the printed area is in substantial alignment with the outline of the shaped pattern of adhesive to create an intermediate assembly that may be further processed, such as by die cutting, to produce communications that can be used to convey information or aid in developing or advancing a promotion. The prime label assembly is then placed on a further temporary carrier web.

The segments, which represent an area of printable stock material, are produced in part, initially from a pre-imaged or pre-printed sheet that is then cut, converted or merged to a continuous type of format through use of a placer mechanism that sequentially places the cut pieces in an overlapping arrangement or alternatively on a temporary web to create a partially laminated assembly.

The sheets are preferably printed with high quality graphics or images which are then slit or cut to size (regular and irregular shapes) to form templates, ribbons, surface elements or segments for the particular application. The segments are coated with silicone or other high release material then converted to or merged with a web to create a continuously advancing web of material in order to create a continuous, intermediate, at least partially laminated roll format that may be collected and further processed. The segments that have been affixed to the web are provided in one or more intermediate laminated configurations to an end user.

By using the process of the present invention high quality graphics can be prepared to further enhance the particular offering that is being created. More particularly, the pressure sensitive intermediate of the instant application can be used to create individual, prime label products having a high or photo quality resolution level such as those about 300 lines per inch or approximately 2500 to 3500 dots per inch.

BACKGROUND OF THE INVENTION

There are currently a plethora of business communication constructions, marketing and advertising pieces and other items that are available in the market today for communicating products and services with an intended audience. Yet with this inordinately large selection of offerings and permutations, there remains a continuing need to develop new products due to changes in technology, societal trends, diversification of marketing, packaging and advertising campaigns and new information handling needs of businesses and consumers alike.

Today, there are wide varieties of product offerings available that serve multiple purposes and functions, including product offerings that are used in fulfilling the needs in the prime label market. Conventional processes that are used today in creating prime labels are typically based on a continuous web technology using flexographic presses. The traditional process of manufacturing such label products includes the feeding of a continuous web of material, such as a preformed web of pressure sensitive laminate, which normally consists of a top ply having a layer of adhesive on its underside that is covered by a release liner to form the laminate assembly through the press. The web is then processed through a press, typically a flexographic press, and an image is applied to the web by various stations. The web may then be collected, die-cut and the individual labels removed and applied.

Flexography is commonly used today for the production of prime label substrates as well as for the printing of decorative items, including the rendering of packaging. The technology employs a series of plates and one or more stations, containing inks (usually a different colored ink at each station) to apply colored images to the web as the web traverses the press. Through improvements in ink qualities and other modifications and enhancements in the technology, the image quality in flexographic presses and resulting products has improved to about 150 lines per inch.

For a point of reference, typically, screens that have rulings of about 60 to 100 lines per inch are normally used to make halftone printed images for newspapers. Screens with about 120 to 150 lines per inch are commonly used today to produce images for magazines and commercial printing. Such screens are regularly produced by electronic dot generation.

Electronic dot generation is normally performed by computers that use unique screening algorithms, in cooperation with electronic scanners and image setters, to produce halftone images that are to be subsequently used to render an image. The pixels of digitized images are first assembled into dots that are then used to form shapes, sizes, rulings, etc. which create the ultimate image produced on the substrate.

While flexographic technology or flexography is desirable for use in such printing, due to the economies that can be achieved when compared with other types of printing processes, such as lithography, there are a number of drawbacks in utilizing this process for certain applications.

Initially, the quality is limited, despite improvements in the technology to about 150 lines per inch. This can make some complicated graphics appear "grainy" or other images, such as those that use flesh tones or deep or rich colors, look faded or "washed out". The effects of this level of image resolution can detract from the product appearance which may diminish the value of the technology and the products produced particularly for the prime label market. With increasing sophistication of consumers, as well as technology and expectations from each, such effects may be undesirable to potential end users.

Flexography also suffers from other drawbacks, such as the time involved in preparing a job to run or "make ready" as it may otherwise be known. That is, the steps that are used to prepare the flexography equipment for running a particular job or order. This make ready includes such activity as the preparation of multiple plates to produce the image at each station, mixing inks, calibration and alignment of the images between stations and the like. Operation of the flexography presses may also include multiple operators, which can add to manufacturing costs.

Waste can also be a problem with such conventional printing technologies in that a number of feet, yards or meters of web material must be processed through the press in order to have the colors reach a predetermined threshold and to ensure appropriate registry of the stations as they are printing the images on the web. The amount of material wasted can be several times the length of the press or up to several hundred feet of material. The use of such volumes of materials obviously increases the cost of the operation. Thus, due to the make ready and waste factors, the production of products, such as prime labels, using flexography may then be limited to serving only certain market segments, namely large market segments.

Another drawback believed to be associated with flexographic technologies is that the technology may not be able to provide any variability in the product, including such basic functionality as sequential numbering, addressing or adding promotional text in connection with a seasonal advertisement or other offering without the addition of further processing stations and investment in equipment. If such features are required by an end user or customer, such as with product date or coding, this function generally cannot be performed by flexographic presses without the inclusion of additional stations and instead typically must occur through an off line operation, such as in an ink jetting operation, often after the label web has been removed from the press and the individual labels have been applied to the container or carton. Alternatively, the ink jetting may be performed directly on the container as part of a separate operation.

Flexographic presses normally have a number of predetermined stations, for example a four color press may have only four stations that can be used to treat or process the web. Thus, if other stations are to be added, such as a numbering head, the manufacturer likely then has to reduce the number of colors that can be added to the web as one station has been surrendered for the numbering head.

Flexographic technology also limits the ability to add personalization to products produced on such presses. This may be particularly desirable in certain market segments such prime label products on consumer package goods ("CPG"), which may further enhance the product or service offering by making the product more attractive to prospective purchasers, thereby increasing the appeal to the consumer of the product or service.

Conventional pressure sensitive assemblies normally include a substrate having on one side a coating of adhesive, that is normally tacky to the touch, and a release liner disposed in a facial relationship with the adhesive to prevent the adhesive from coming into contact with the various processing surfaces of the apparatus that is handling the web of pressure sensitive material. The liner material will typically consist of a highly calendared stock to which a layer of silicone has been applied to one side of the stock. In use, the liner material is stripped away from the pressure sensitive adhesive assembly and is normally discarded. The adhesive will remain with the substrate to which it was originally applied as the adhesive has a greater affinity for the label substrate or sheets than for the carrier web or liner material as the label segments do not have a release coating applied to the surface in contact with the adhesive.

One problem associated with pressure sensitive web assemblies is that the carrier web is normally fully coated with adhesive, that is the adhesive typically extends from edge to edge and side to side of the web. In such instances, when attempting to strip away the matrix, the area that surrounds the label after the label has been cut, the adhesive backed matrix can be difficult to handle and may require additional processing or handling steps. In addition, in attempting to strip away the matrix, the adhesively coated web can cause ripping or tearing of the die cut label portions thereby destroying the intended printed product. This is perhaps more true in situations where the shape of the label is other than a standard geometric configuration, e.g. square, circle, rectangle, triangle, etc. such as may be found with specialty shaped labels, intricate patterns and the like.

What is needed therefore is a method by which a manufacturer of printed products can produce a high quality prime label product through use of an innovative process that avoids the aforementioned drawbacks.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Unexpectedly, it has been discovered that there is no readily available process or system by which a manufacturer can create high quality, intricately formed specialty prime labels having significantly improved graphic resolution that is greater than at least about 150 lines per inch, preferably greater than about 200 lines per inch and still more preferably about 300 lines per inch, in an efficient and cost effective manner. The development of the present system, process and the creation of the unique intermediate web assembly described in this invention permit the servicing of a particular niche market segment for specialty prime labels, that of approximately 100 to 1,000,000 prime labels. While the foregoing market size or segment is a target area of the present invention, it should be appreciated that the invention may be practiced and used to fulfill larger order quantities, such as those of a million labels or more.

The pressure sensitive intermediate of the present invention is created through a unique sheet or segment to roll process which provides savings when compared with conventional flexography processes, specifically through reduced make ready time and generation of waste material. In addition, through practice of the present invention the resulting process yields an intermediate product having a higher image resolution product when compared with conventionally produced prime label constructions.

The present invention uses previously prepared individually created sheets, or segments, which may have been initially created as part of a web and then cut from the web, that have high resolution imaging or printing already applied to the sheets, e.g. graphical depictions, before the sheets are provided to the manufacturing press and merged with a carrier web. The printed portions are produced in a shaped configuration and are provided on a shaped pattern of adhesive that substantially matches the shape or configuration of the printed area or portion.

The sheets, ribbons or segments may be applied to the web in a number of patterns, including substantially edge-to-edge configuration, with a slight overlap or alternatively, provided in regularly occurring increments depending on the needs of the particular application to be serviced. In addition, the product produced in connection with the present process described in the instant application is not limited in functionality as a number of materials, operations and options may be used in creating a relatively dynamic product. Such additional processes may include variable printing, embossments, coatings, over laminates and the like.

By preparing the intermediate prime label assembly in the manner described herein, the intermediate web can be processed continuously at speeds of greater than 50 feet per minute, preferably between 75-150 feet per minute and still more preferably at speeds of about 200 feet per minute or greater.

In one exemplary embodiment of the presently described invention, a prime label laminate assembly is produced in accordance with the following process and includes the steps of initially providing a first web and then applying a shaped pattern of adhesive to the first web and applied to a first face and over a release coating. The shaped pattern of adhesive has an outline that corresponds to the shape.

A second web is supplied and then a pattern is printed on a first face of the second web. The printed pattern has an outline that generally conforms to the outline of the shaped pattern of adhesive. The second web is adhered to the first web such that the printed pattern is substantially juxtaposed over the shaped pattern of adhesive so that the outline of the printed pattern and the outline of the pattern of adhesive are substantially in alignment with one another.

The web is then cut into individual pressure sensitive label segments with each of the segments having an area that includes at least the outline of the printed pattern and the outline of the shaped pattern of adhesive. Finally, each of the segments are positioned on an intermediate carrier web in a sequential manner.

In addition to the foregoing embodiment, each of the label segments may be placed in a hopper prior to being placed on the web. The placing mechanism assists in sequencing or registering each segment that is to be placed on the web so that each segment is disposed in a specific position on the web. The web may then be collected, and each of the segments may then be removed from the carrier web in order to either use the label segments or prepare the segments for shipping.

In a further embodiment of the presently described embodiment, a method of creating a series of intricately shaped prime labels on a carrier web is described and includes the steps of initially providing a first web of material. The first web has first and second faces with a release coating applied to the first face. Next, at least first and second shaped patterns of adhesive are applied over the release coating on the first face. The first pattern of adhesive has shape that is distinct from the second pattern of adhesive.

A second web of material is supplied that has first and second faces. At least first and second shaped patterns are printed on the first face of the second web. The first shaped printed pattern corresponds substantially to the first shaped pattern of adhesive and the second shaped printed pattern corresponds substantially to the second shaped pattern of adhesive.

The second web is juxtaposed on the first web such that the first and second shaped printing patterns are in substantial alignment with the first and second shaped patterns of adhesive.

In a yet still further exemplary embodiment of the presently described invention a method for producing a web assembly that has a series of discrete prime label configurations is described and includes initially advancing a carrier web of material in a machine direction.

Next, a first prime label segment is placed on the carrier web at a first position. The first prime label segment comprises a first shaped printed layer, a first shaped pattern of adhesive which corresponds in shape to the first printed layer and a backing material which is applied to the shaped pattern of adhesive opposite the first printed layer.

A second prime label segment is positioned on the carrier web at a second position that is distinct from the first position. The second prime label segment comprising a second shaped printed layer that is distinct from the first shaped printed layer, a second shaped pattern of adhesive which corresponds in shape to the second printed layer and a backing material that is applied to the shaped pattern of adhesive opposite the first printed layer.

Continuing with the presently described embodiment, at least a third prime label segment is juxtaposed on the carrier web at a third position that is distinct from the first and second positions. The third prime label segment comprising a third shaped printed layer that is distinct from the first and second shaped printed layers, a third shaped pattern of adhesive which corresponds in shape to the third printed layer and a backing material that is applied to the shaped pattern of adhesive opposite the third printed layer. The carrier web is moved with at least the first, second and third prime labels thereon to a collection area and then the carrier web is collected.

Each of the foregoing embodiments may include the addition of a fourth label segment and the printing of each of the printed layers at a resolution of greater than about 150 lines per inch.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 6 depicts a still further block diagram setting forth a still further exemplary method of carrying out the presently described invention.

DETAILED DESCRIPTION OF THE INVENTION

Figure 1:
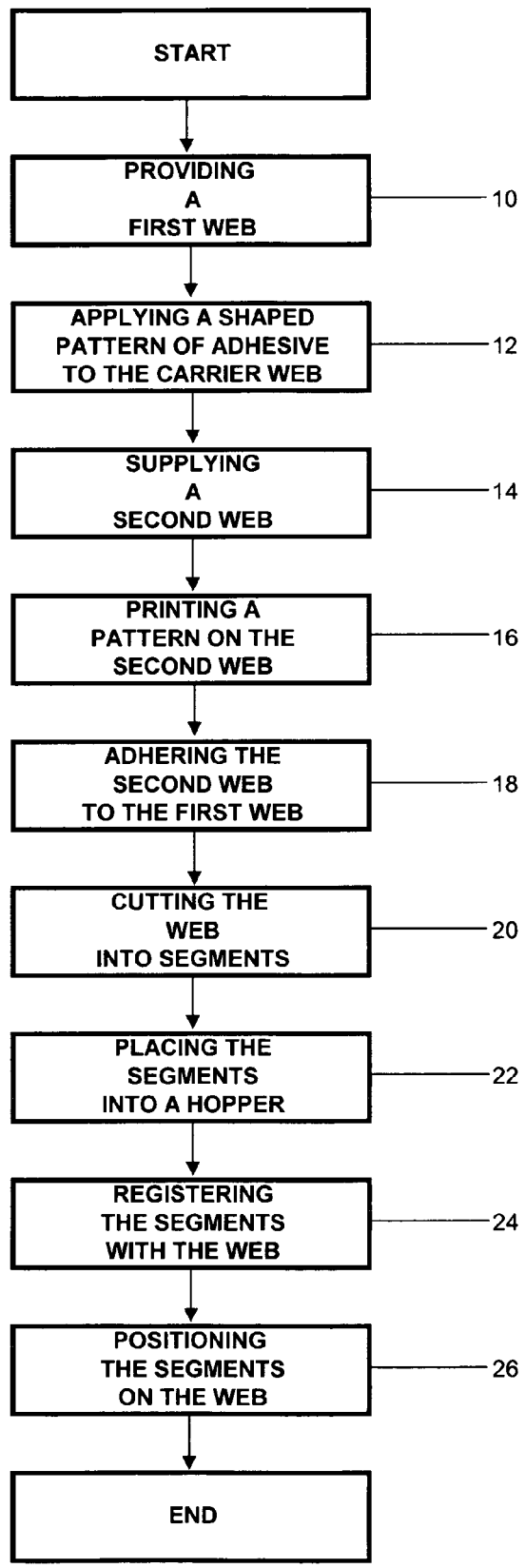
FIG. 1 depicts a block diagram setting forth an exemplary method of carrying out the presently described invention.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

The term "prime label" as used herein refers to a label or other identification piece that may be used interchangeably with labels, such as tags, typically having a pattern of adhesive disposed on one side of a substrate and one or more graphical illustrations or depictions on the opposite side. Some level of textual messaging may also be provided on the face of the label. The adhesive is typically a pressure sensitive adhesive but may also include activatable adhesives such as thermally or moisture sensitive materials. However, it should be understood that all prime labels need not be provided with an adhesive.

Prime labels are further distinguished from other labels in the art in that such labels are known as having a high level of quality or value. The term prime label is often used to describe a type of label that is the highest grade marketed in a particular industry. Prime labels find application in a number of exemplary areas but have found wide range acceptance particularly in the area of consumer packaged goods ("CPG") and other products for which the prime label is an effective means for communicating a specific message or for enhancing the image of the manufacturer or distributor or presenting the product as a high quality item. Prime labels are also used for business communications in that they can convey certain desirable criteria, image, brand recognition or information and can be used independently of a product, such as in connection with advertising a service opportunity or offering, or with other activities or undertakings, such as non-profit organizations.

Prime labels, particularly prime labels prepared in accordance with the present invention, may also contain printed messages, including personalized and/or variable information in addition to the graphical displays. The printed messages can be fixed or static, as will be explained herein, may be personalized or sequentially numbered or provided with other unique or special identifiers.

There are a number of terms used throughout the instant specification which are discussed below in cursory terms. The definitions provided are not intended to limit the scope of the invention and the information is provided for illustrative purposes.

The term "patterns" as used herein refers to strips, lines, shapes, spots, dots, elements and discontinuous segments, as well as regular and irregular placement of such items. Patterns may also refer to combinations of the above-mentioned items such that one pattern may be a continuous strip; another, segmented elements; and a still further irregular placement of elements or the like. Any combination of patterns is possible depending on the need or application of the manufacturer or the end user. In addition, the pattern can be prepared in order to accommodate a particular theme, season, event, trade dress, graphics, alpha and numeric characters, and the like. Patterns are used in connection with the present invention to describe the placement of the label segments or ribbons applied to the web or individual prime labels positioned on the web in a particular pattern or arrangement. Pattern as defined herein also is used in connection with the adhesive that is applied to the continuous web.

As used herein, the term "business communication piece or document" refers to a substrate that, either alone or in combination with other documents, can convey a particular message or image or provide information about a particular product or service that is available from the provider of such pieces or documents. Business communication documents or pieces can include advertising, sales and marketing collateral and such other items used to convey information on written or imaged form sheets, brochures, presentation folders, informational sheets and combinations thereof.

The term "personalized information" refers to information that is printed or imaged onto a substrate, which is generally variable or unique and which may change from document to document or segment to segment so as to create a customized message or communication for each recipient. Examples of personalized information may include names, addresses, descriptions, plans, coding, numbering, promotional text, etc. that may have been acquired from the intended recipient through surveys, questionnaires or answers given to various inquiries generated in response to a request for goods or services.

The term "static or fixed" information refers to printed or imaged information that generally does not change from document to document or segment to segment and may include a general description or body of information about particular products, services, places, etc. that may be of interest to the intended recipient and represents a standard message that the manufacturing or supplier wishes to convey to an end user or customer of the offering.

The term "intermediate" as used herein refers to a product that undergoes one or more processing steps prior to the intermediate reaching a final condition, that of being ready for end use or application. The additional processing steps may include printing, imaging, folding, sealing, separating, cutting, perforating, scoring, adhering and the like. Typically, a product such as with the present invention is provided in an intermediate condition so that a user can add or manipulate the intermediate to create the final or desired end product, such as applying the prime label to a container, carton or the like. Thus, in accordance with the present invention, the intermediate segment, for example, could be subject to die cutting or additional printing, such as through ink jetting, over laminating, coating or embossment, and then applied to a container, carton, consumer package good or the like.

The term "sheets" or "segments" as used herein refers to sheets, segments, ribbons, strips, pieces, parts, sections, subdivisions and combinations thereof. The sheet or segment provided as an example for the purposes of this specification can be an entire sheet such as 8½"×11", 11"×14", 19"×25" and other known sheet sizes or may be segments, divisions, strips, etc. of such sheets. For example, a 19"×25" sheet may be produced with five rows of labels, with each row having six labels, with each label having dimensions of approximately 3"×4". For instance, in this example, each row may comprise an individual segment or sheet that may be used in practicing the present invention. It should, however, be understood that the invention is not to be so limited to the foregoing configuration that individual pieces or elements, regardless whether the piece or elements have a regular or irregular shape, may be used in connection with this process to produce the intermediate assembly that is described in this application.

An exemplary high resolution imaging device that is used in preparing the areas of the sheets that will become the prime label segments as well as the film, if the film is preprinted, used to cover the segments in accordance with the present invention includes an Indigo®, available from Hewlett Packard of Palo Alto, Calif. or Karat available from KBA of Williston, Vt. The present invention seeks to provide a prime label segment or intermediate that has a quality of at least about 150 or more lines per inch and preferably more than 300 lines per inch, which is approximately equal to about 2500 to 3500 dots per inch ("DPI") in order to create a high quality image that is intended to be aesthetically appealing to the consumer.

An exemplary placer, feeder or insertion device that is used in the practice of the present invention is a Maverick® unit that is available from In-Line Automation of Minneapolis, Minn. The unit may use vacuum cylinders, belts or other suitable transfer means to transfer the individual segments to the web of material.

Turning now to FIG. 1 which provides a block diagram depicting an exemplary process of practicing the presently described invention. The process is started by providing a first web at step 10. The web will preferably be a calendared cellulosic material having first and second faces and a release coating, such as silicone applied to the first face of the web. Next, at least one shaped pattern of adhesive is applied at step 12 over the release coating on the carrier web. The shaped pattern will preferably be an intricate pattern that is not a square, circle, rectangle, triangle or the like.

A second web is supplied at step 14 and a pattern is printed on the first face of the second web at step 16. The pattern will be printed at a resolution of greater than about 150 lines per inch and preferably at a higher resolution. The pattern will have an outline or shape that will correspond generally to the outline or shape that has been provided in the adhesive pattern. In this manner, the label assembly can be more readily removed from the surrounding matrix as the adhesive does not extend in to the matrix area thereby reducing the strength required to peel the label from the backing material or release layer.

After the second web is printed at step 16, the second web is adhered to the first web at step 18. The printed pattern will be disposed substantially over the shaped adhesive pattern so that the outline of each of the shapes will be in substantial alignment with one another. Adhering the webs together will create a laminated assembly that can then be cut into individual label segments at step 20. The segments, each of which may either be of a regular size or alternatively may be different sizes or shapes, are then placed into a hopper of a placer mechanism at step 22. The placer mechanism is then used to register and sequence the label segments with another carrier web at step 24. The individual segments are then positioned on the web at step 26.

Figure 2:
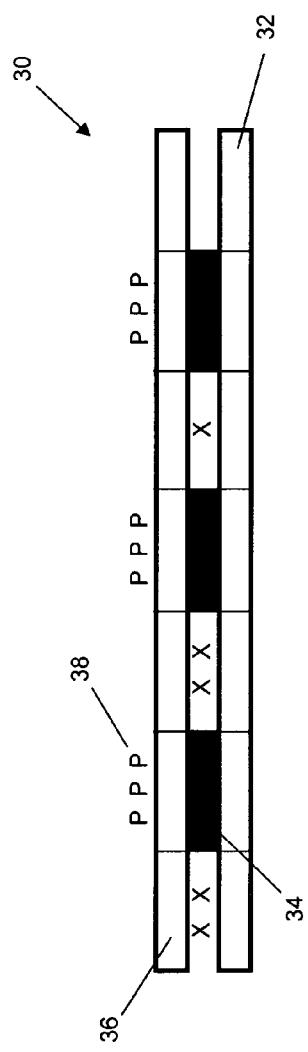
FIG. 2 illustrates a cross sectional view of a prime label assembly produced in accordance with the method of the presently described invention.

Attention is now directed to FIG. 2 of the presently described embodiment and includes a cross section of a label segment, referred generally to by reference numeral 30. The label segment 30 has a backing layer 32 that is formed from a release coated carrier web. A pattern of adhesive 34 is applied over the release coated face of the carrier web 32. As can be seen from the drawing shaded areas are used to show the pattern of adhesive whereas "x" are used to show adhesive free areas. Thus, illustrating that the pattern of adhesive corresponds to the pattern of printing.

A printed layer with printing patterns 36 is then applied over the pattern of adhesive 34 to create the discrete label areas. The printed patterns are designated by reference numeral 38 and represented by letters "PPP". The printed layer is also preferably a cellulosic material, which may be coated with a toner or ink receptive coating.

Figure 3:
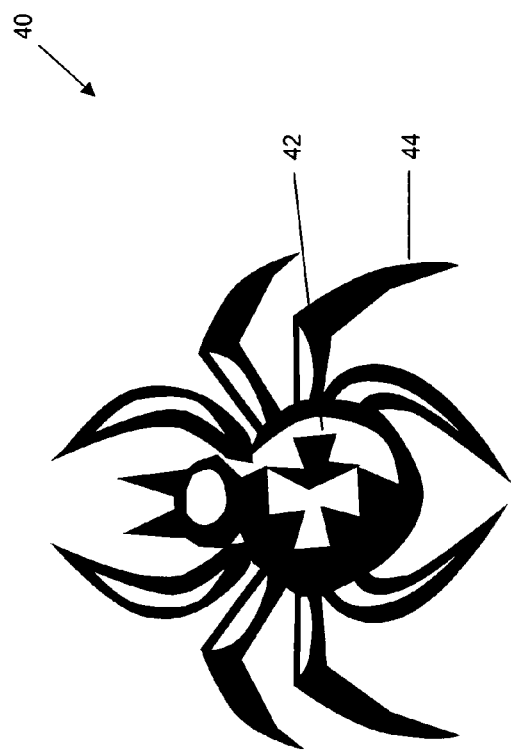
FIG. 3 provides a front view of a prime label assembly produced in accordance with the method of the presently described invention.

FIG. 3 is used to depict an intricate pattern label generally depicted by reference to numeral 40, which in FIG. 3 is illustrated as a spider. The label has a central portion 42 and a number of outlying parts or pieces 44, here the legs of the spider. By using a pattern coated adhesive, the pattern of the adhesive will correspond to the pattern of the printing, so that upon removal of the printed label portion, or alternatively the stripping of the matrix from around the label, the intricate label configuration is less likely to tear than if the adhesive extended not only under the printed portion but also under the matrix or surrounding portion.

Figure 4:
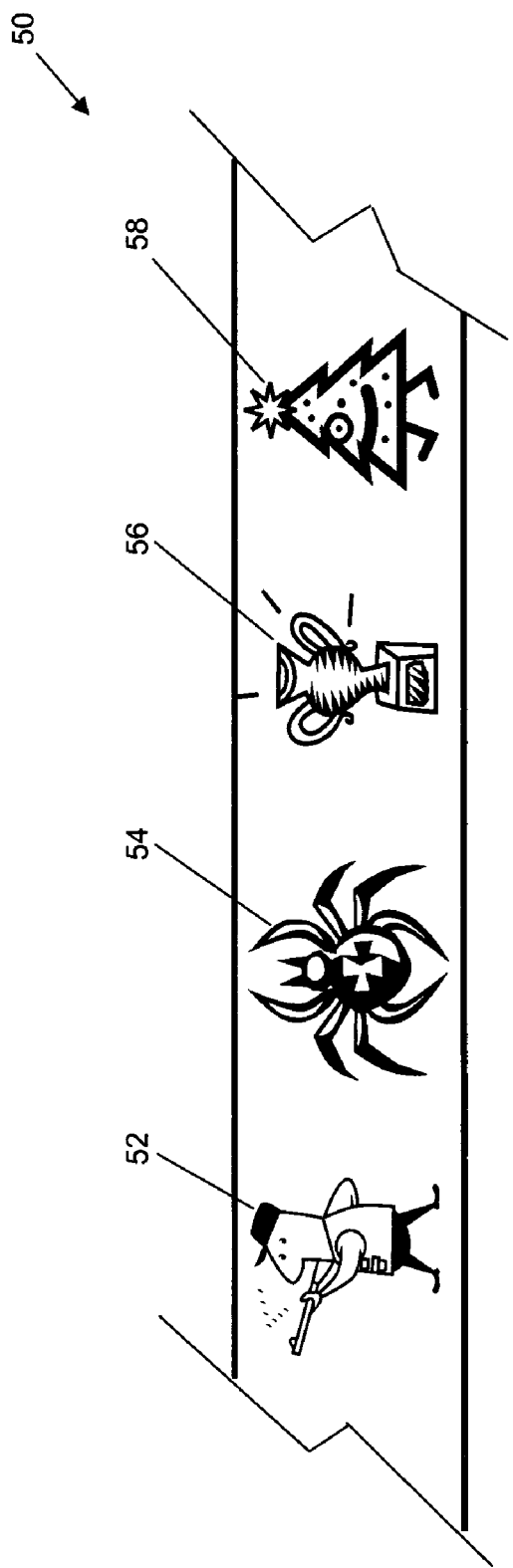
FIG. 4 shows a series of prime label assemblies produced in accordance with the present invention applied to a carrier web in a sequential fashion.

FIG. 4 shows a carrier web assembly, depicted generally by reference numeral 50 having a series of individual, intricately shaped prime label assemblies 52, 54, 56 and 58 showing first, second, third and fourth prime labels disposed at distinct positions on the web 50. The prime labels are placed in a predetermined position and registered or sequenced to appear at specific points. Each of the shapes of the labels is distinct from one another to illustrate that the system can be used to create and assembly truly unique configurations of prime label products.

Figure 5:
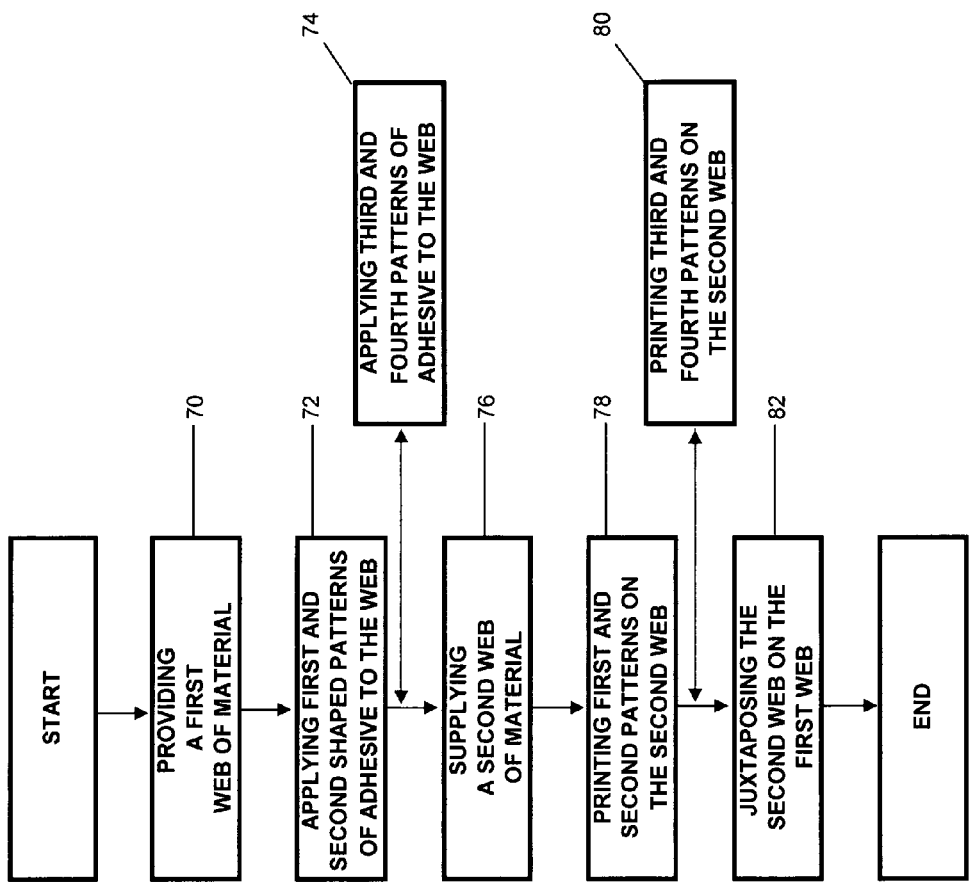
FIG. 5 illustrates a block diagram setting forth an alternative exemplary method of carrying out the presently described invention.

Reference is now directed to FIG. 5 which provides another block diagram which illustrates another exemplary method of practicing the presently described invention. The process is started by providing a first web of material at step 70 to which at least a first and second distinct patterns of adhesive are applied to the web at step 72. Additional, third and fourth patterns of adhesive, which are each different or distinct from one another may be applied at step 74.

A second web of material is provided at step 76 which is then printed with first and second patterns at step 78. If third and fourth patterns of adhesive are provided at step 74, then third and fourth patterns of printing are provided at step 80. Each of the printing patterns will have an outline of a shape that is substantially equivalent to the outline or shape of the corresponding pattern of adhesive that is applied on the first web. Then, the first and second webs are juxtaposed at step 82 which finally aligns the patterns of printing with the patterns of adhesive.

FIG. 6 is a further block diagram which provides an exemplary method of practicing an alternative method of the presently described invention. The process is started by advancing a carrier web at step 100. A tacking layer of adhesive may be applied at step 102 which will be used to at least temporarily hold the individual label segments to the surface of the carrier web. The system that is used to place the individual label segments on the web may initially sequence the label segments that for example may be provided in a hopper mechanism at step 104 to make sure the correct label segment will be placed in the proper position on the carrier web.

A first prime label segment is placed on the carrier web in a first position at step 106. A second prime label segment, which has a different pattern of adhesive and printing pattern than the first prime label segment, is placed on the web in a second position at step 108 which is different or distinct from the first position. Next, a third prime label segment, which has a different pattern of adhesive and printing pattern than each of the first and second prime label segments, is placed on the web in a third position at step 110 which is different or distinct from the first and second positions.

A fourth prime label segment, which has a different pattern of adhesive and printing pattern than each of the first, second and third prime label segments, is placed on the web in a fourth position at step 112 which is different or distinct from the first, second and third positions. The process, where additional labels are placed on the carrier web can continue with further distinct labels being placed on the web, or alternatively, the four label types can be repeated or the order shuffled depending on the sequencing done by the system that operates the process.

The carrier web, along with the prime label segments attached, is moved at step 114 to a collection point and then the web is collected at step 116 and the individual segments may be removed from the web as step 118 and the process can be started again with another order or with a repeat of the same order or grouping that has been described above in connection with this process.

The method described in the invention utilizes an intricately patterned adhesive along with a mirror printed pattern in order to create a prime label segment that can then be easily manipulated and combined with an intermediate carrier label web.

It will thus be seen according to the present invention a highly advantageous method for producing intricately shaped prime labels has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A method of manufacturing a label product, comprising the steps:
    providing an arrangement of ink on a first web to define an image; the image having an outer boundary and a central portion; the arrangement of ink being configured such that a part of the image central portion has the ink and another part of the image central portion is substantially devoid of the ink;
    applying adhesive on a second web in an arrangement substantially identical to the arrangement of ink;
    joining the first and second webs together using the adhesive such that the arrangement of ink and the arrangement of adhesive are substantially aligned; and
    cutting and separating the joined first and second webs to define: (a) a label having the arrangement of ink and the arrangement of adhesive; and (b) a remainder of the first and second webs;
    wherein the remainder of the first and second webs is substantially free of the adhesive adjacent the label.

2. The method of claim 1, further comprising the step of positioning the label on a third web.

3. The method of claim 1, wherein the adhesive is a pressure-sensitive adhesive.

4. The method of claim 1, wherein the adhesive is applied on the second web atop a release material.

5. A method of manufacturing a label product, comprising the steps:
    providing an arrangement of ink on a first web to define a plurality of images;
        each image having an outer boundary and a central portion; the arrangement of ink being configured such that a part of each image central portion has the ink and another part of each image central portion is substantially devoid of the ink;
    applying adhesive on a second web in an arrangement substantially identical to the arrangement of ink;
    joining the first and second webs together using the adhesive such that the arrangement of ink and the arrangement of adhesive are substantially aligned; and
    cutting and separating the joined first and second webs to define: (a) a plurality of labels each having a portion of the arrangement of ink and a portion of the arrangement of adhesive; and (b) a remainder of the first and second webs;
    wherein the remainder of the first and second webs is substantially free of the adhesive.

6. The method of claim 5, further comprising the step of positioning the labels on a third web.

7. The method of claim 5, wherein the adhesive is a pressure-sensitive adhesive.

8. The method of claim 5, wherein the adhesive is applied on the second web atop a release material.

* * * * *